United States Patent

Takahashi et al.

Patent Number: 4,991,014
Date of Patent: Feb. 5, 1991

[54] KEY SIGNAL PRODUCING APPARATUS FOR VIDEO PICTURE COMPOSITION

[75] Inventors: Hiroshi Takahashi; Takayuki Iijima, both of Tokyo, Japan

[73] Assignee: NEC Corporation, Japan

[21] Appl. No.: 159,240

[22] Filed: Feb. 19, 1988

[30] Foreign Application Priority Data

Feb. 20, 1987 [JP] Japan .................................. 62-37330

[51] Int. Cl.$^5$ .............................................. H04N 5/275
[52] U.S. Cl. ........................................ 358/183; 358/22
[58] Field of Search ............... 358/183, 182, 149, 150, 358/22

[56] References Cited

U.S. PATENT DOCUMENTS

| | | | |
|---|---|---|---|
| 4,751,579 | 6/1988 | Okunishi | 358/183 |
| 4,758,892 | 7/1988 | Bloomfield | 358/22 |
| 4,831,447 | 5/1989 | Lake, Jr. | 358/183 |

Primary Examiner—Tommy P. Chin
Attorney, Agent, or Firm—Ostrolenk, Faber, Gerb & Soffen

[57] ABSTRACT

First and second memories are provided for receiving key signals which control a display to output a video composition made up of a plurality of video signals. The key signals are received from a key signal generator in synchronism with the speed of the key signal generator. The first memory receives a key signal directly, while the second memory receives a gated key signal for storing a key signal related to, for example, a still image, and the gating is controlled so that the key signal in the second memory is only overwritten when it is expressly intended to do so. A read address generator controls the reading out of key signals from both memories, in synchronism with the speed of the display apparatus which displays the video images. A further gate may be provided to control input of key signals into the first memory, this further gate being controlled by the state of the output key signal coming from the second memory. Another aspect of the invention relates to a system comprising a plurality of first memories for receiving, storing, and outputting a plurality of key signals, respectively. A selector is provided for selecting one of the plurality of output key signals, and the selected key signal is received and stored in a second memory and outputted as a second output key signal. A priority order setting system selects and outputs the first output key signals from the first memory and the second output key signal from the second memory according to a first priority order. A second priority order setting system may select and output the first output key signals according to a second priority order.

12 Claims, 5 Drawing Sheets

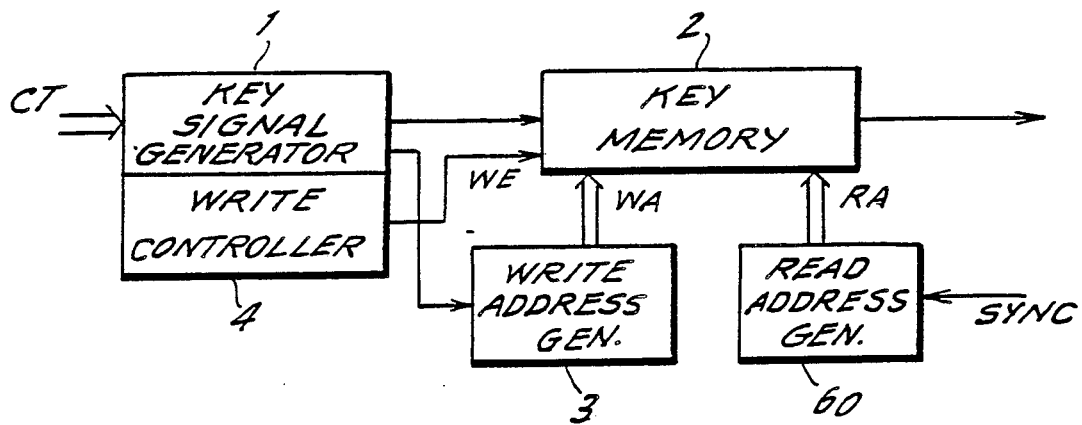
FIG. 1 - PRIOR ART
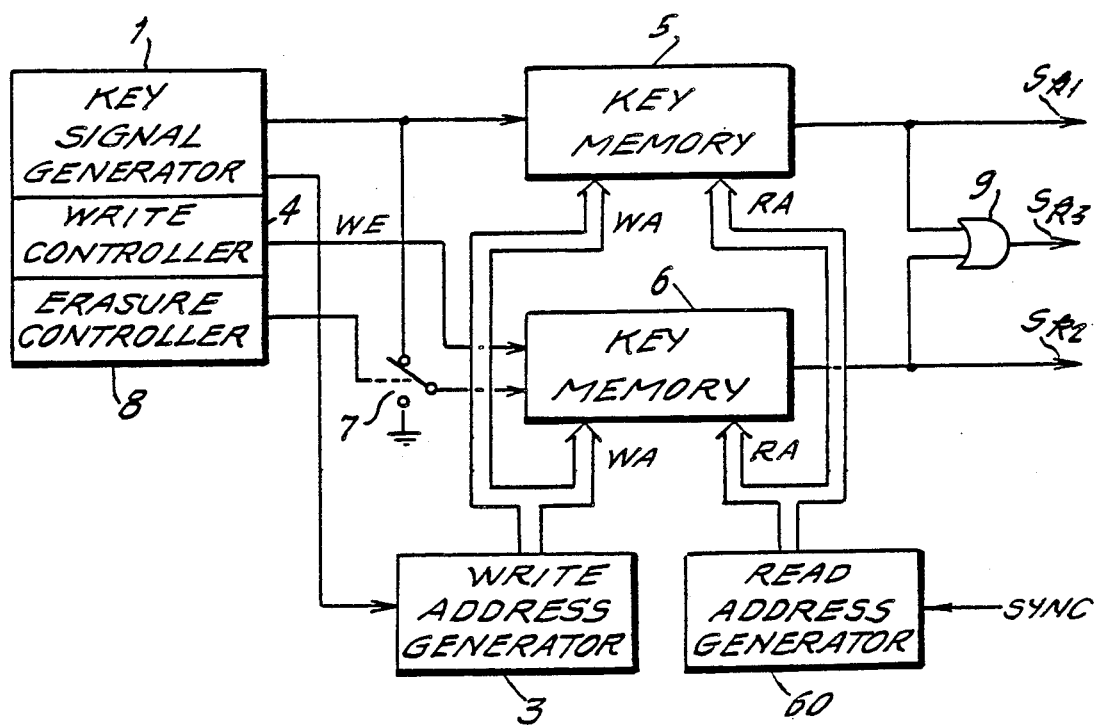
FIG. 2.

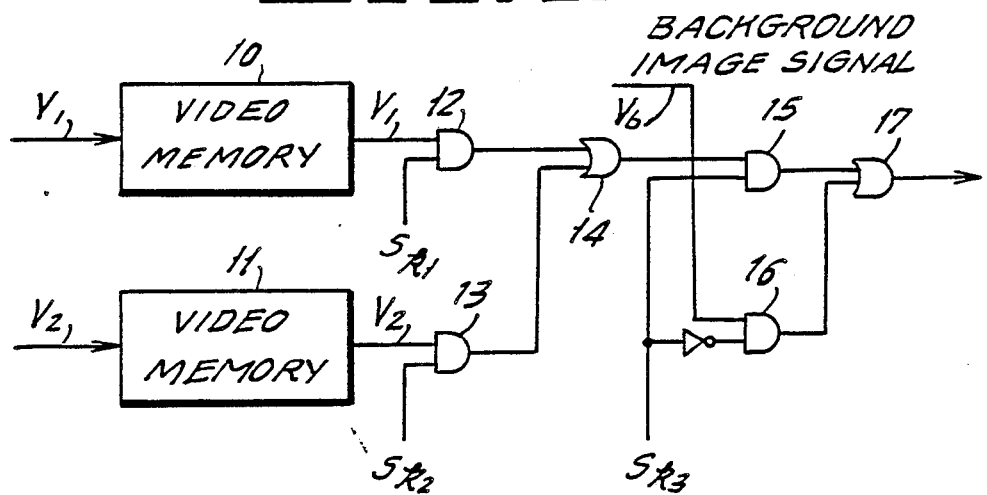
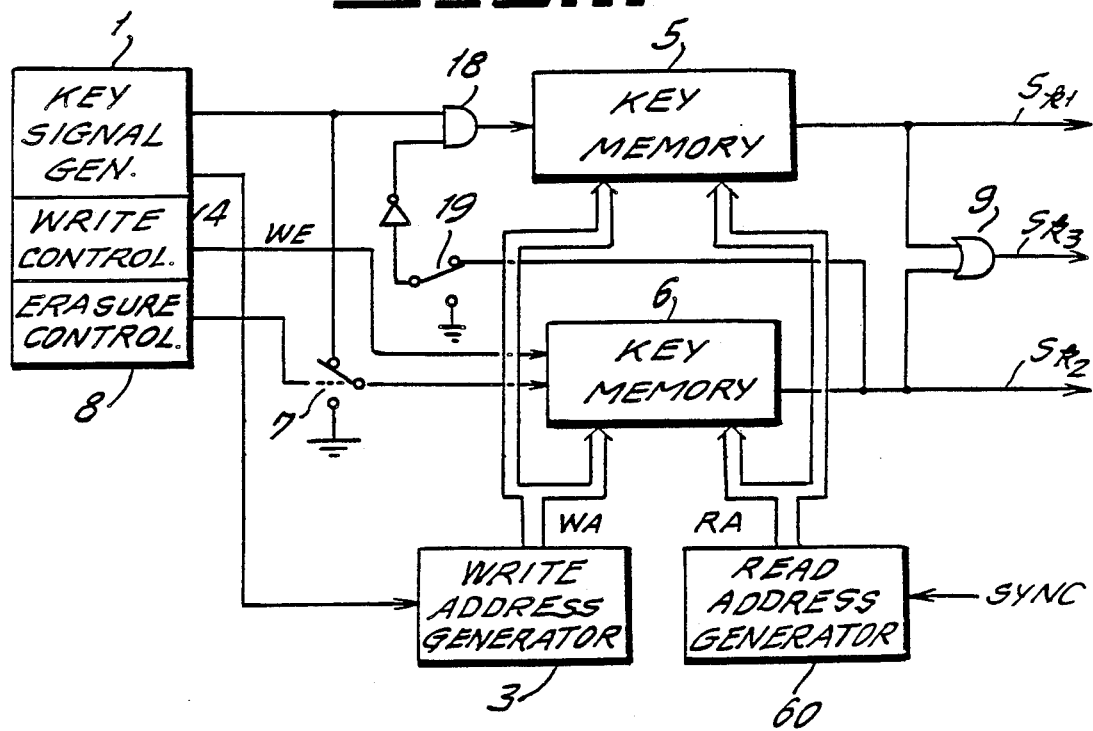

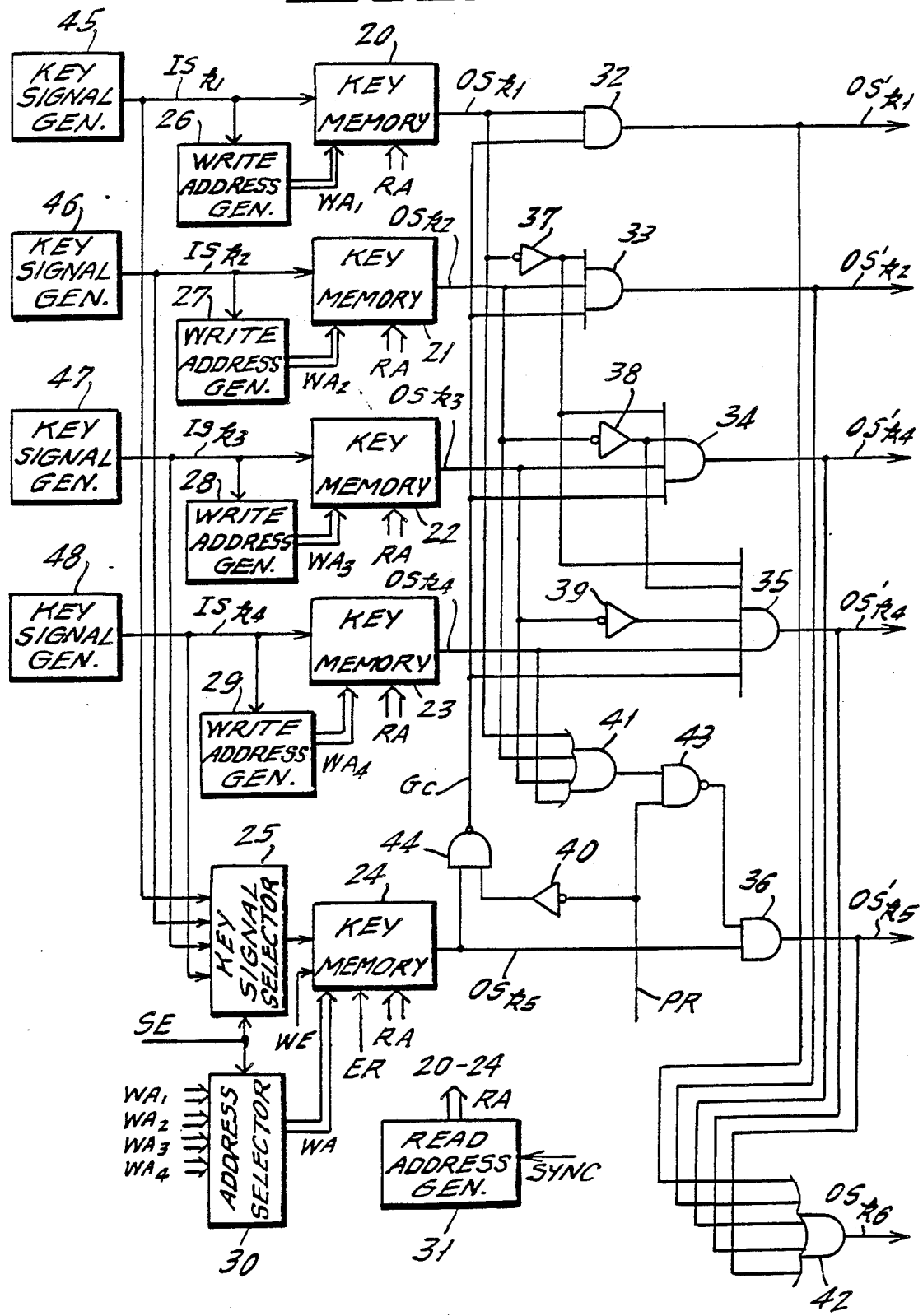

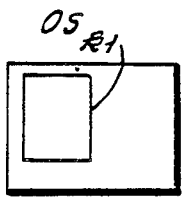 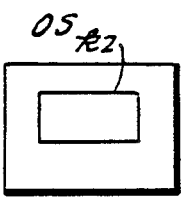 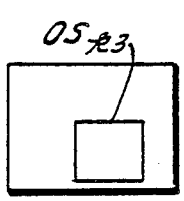 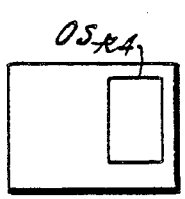 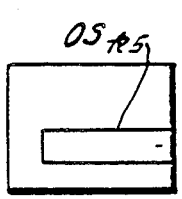
FIG. 7a  FIG. 7b  FIG. 7c  FIG. 7d  FIG. 7e
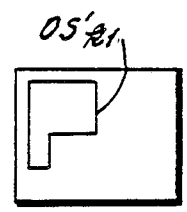 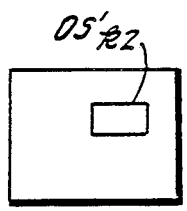 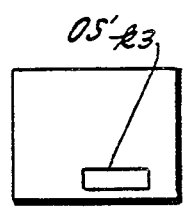 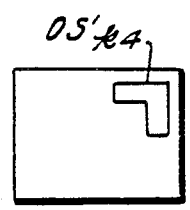 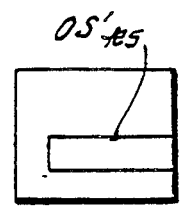
FIG. 7f  FIG. 7g  FIG. 7h  FIG. 7i  FIG. 7j
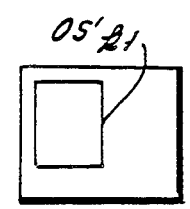 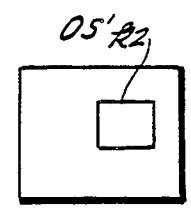 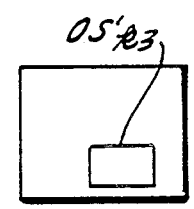 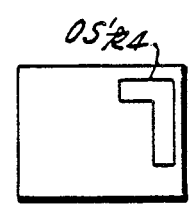 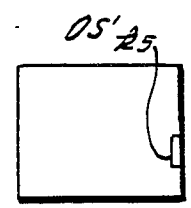
FIG. 7k  FIG. 7l  FIG. 7m  FIG. 7n  FIG. 7o
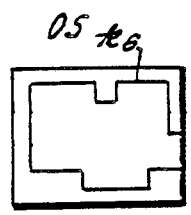
FIG. 7p

KEY SIGNAL PRODUCING APPARATUS FOR VIDEO PICTURE COMPOSITION

BACKGROUND OF THE INVENTION

The present invention relates to a video picture composition system for displaying a plurality of video signals on a display device in a composition manner which is used as both a computer display terminal and a TV display device and, more particularly, to a key signal producing apparatus which generates a key signal for controlling picture composition.

Conventionally, in order to compose a plurality of video signals associated with a plurality of picture elements on a display device, a key signal is used for specifying a position, a size and a shape of each picture element. In response to the key signal, the video signal corresponding to the picture element is gated to form a composite picture. Generally, a key signal producing apparatus includes a key signal generator for generating a key signal for specifying a desired shape, size and position, a memory for storing the key signal for one frame period, a write address generator for generating a write address to store the key signal into the memory, and a read address generator for generating a read address to deliver the key signal from the memory. The key signal generated by the key signal generator is first written in the memory and is then read out. The reason for the inclusion of the memory in the key signal producing apparatus is that the display device of this kind does not always have the same display speed (in terms of horizontal and vertical scanning frequencies) but has various display speeds and, thus, it is necessary to convert a key signal speed associated with the key signal generator to a speed associated with the display device. This speed conversion is realized by matching the reading speed of the memory to the display speed of the display device.

However, the conventional key signal producing apparatus can not produce a key signal to make a picture effect where one picture element is to be moved on the screen in response to a shifting key signal, while another picture element is to be displayed at a certain position without moving in response to another still key signal. This is partly because both key signals would require the use of the same memory; the shifting key signal cannot be outputted, after being generated, by the key signal generator unless first written in the memory, and but the other still key signal will disappear if the succeeding key signal (the shifting key signal) is written therein.

SUMMARY OF THE INVENTION

It is, therefore, an object of the present invention to provide a novel configuration of a key signal producing apparatus which can display an additionally picture element on a display screen, while also displaying a first picture element in the same portion of the display screen.

According to the present invention, there is provided a key signal producing apparatus comprising: a key signal generator for generating a key signal; a first key memory for sequentially storing a key signal from the key signal generator and sequentially delivering it in conformity to a display speed; a second key memory for selectively storing a key signal from the key signal generator and delivering it in conformity to the display speed; write control means for feeding a write timing signal to the second key memory; and erasing means for erasing the stored content of the second key memory.

BRIEF DESCRIPTION OF THE DRAWINGS

FIG. 1 is a block diagram showing a configuration of a conventional key signal producing apparatus;

FIG. 2 is a block diagram of a first embodiment according to the present invention;

FIG. 3 is a block diagram of a video composing apparatus in which a plurality of video signals are composed into a picture in response to a key signal produced by the first embodiment of FIG. 2;

FIG. 4 is a block diagram of a second embodiment according to the present invention;

FIG. 6 is a block diagram of a third embodiment according to the present invention; and FIGS. 7(a) to (p) are diagrams showing behaviors of key signals on the display screen so as to explain the operation of the third embodiment shown in FIG. 6.

DESCRIPTION OF THE PREFERRED EMBODIMENTS

Figure 5A:
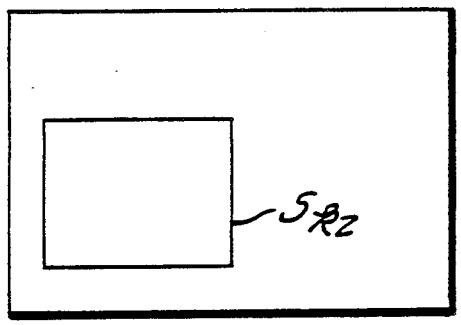
FIGS. 5(a), (b), (c) and (d) are diagrams showing behaviors of key signals on a display screen so as to explain the operation of the second embodiment shown in FIG. 4.

Before the detailed description of embodiments of the present invention, cursory review will be made of a conventional key signal producing apparatus.

FIG. 1 is a block diagram of a conventional key signal producing apparatus. A key signal which defines a predetermined size, a shape and a position is generated by a key signal generator 1 in response to control information CT and is stored in a key memory 2 in response to a write address WA from a write address generator 3. The write address generator 3 generates the write address in synchronism with the speed of the key signal. Moreover, a write controller 4 generates a control signal WE for providing the write timing of the key memory 2. In response to a synchronizing signal Sync from a display device (not-shown), on the other hand, a read address generator 60 generates a read address RA at a speed corresponding to the display speed of the display device, and sends it to the key memory 2. This makes it possible to fetch a key signal synchronized with the display speed from the key memory 2.

In the conventional key signal producing apparatus shown in FIG. 1, as has been described hereinbefore, there cannot be attained the effect, in which a picture element is disposed in one portion of the display screen in response to one key signal whereas another picture element is also displayed and moved in response to another succeeding key signal.

FIG. 2 is a block diagram showing one embodiment of the present invention, which is different from the conventional configuration of FIG. 1 in that it is equipped with two key memories 5 and 6, an erasure switch 7 to erase a stored content of the memory 6, and an erasure controller 8 to provide the erasure timing to the switch 7. Further, there is disposed an OR gate 9 for taking a logical OR sum between the outputs of the two memories 5 and 6.

As shown in FIG. 2, the memory 5 always writes in the key signal supplied from the key signal generator 1 and always delivers a key signal $S_{k1}$ speed-synchronized with the synchronizing signal Sync of a display device. On the other hand, the key memory 6 is controlled by a control signal WE supplied from the write controller 4 whether or not a key signal from the key signal generator 1 is to be written therein. Moreover, the content stored in the key memory 6 can be erased if the erasure switch 7 is switched by the erasure controller 8.

If a still key signal is written in the key memory 6 and an output key signal $S_{k2}$ is fetched therefrom and, on the other hand, a moving key signal is written into and fetched from the key memory 5, an effect including the composition of a still picture element and a moving picture element can be obtained, although it is impossible in the conventional configuration. Therefore, according to the present invention, it is possible to compose different picture elements in response to the key signals $S_{k1}$ and $S_{k2}$ delivered from the key memories 5 and 6 and, further, possible to compose a picture element in response to the key signal $S_{k3}$ delivered from the OR gate 9, which is defined by both the key signals $S_{k1}$ and $Sk_2$.

FIG. 3 is a block diagram of a video composing apparatus in which two video signals $V_1$ and $V_2$ are composed with a background image by using the key signals $S_{k1}$ and $Sk_2$ produced by the embodiment of FIG. 2. The video signals $V_1$ and $V_2$ delivered from video memories 10 and 11 are gated by AND gates 12 and 13 under respective controls of the key signals $S_{k1}$ and $S_{k2}$. The outputs of the gates 12 and 13 are sent through an OR gate 14 to an AND gate 15 where output is gated by the key signal $Sk_3$. On the other hand, the background image signal $V_b$ is sent to an AND gate 16, in which it is gated by the inverted signal of the key signal $S_{k3}$. The outputs of the AND gates 15 and 16 are outputted as a composed video signal from an OR gate 17.

In FIG. 3, the background image signal $V_b$ is a video signal which is synchronized with the display speed of a display device, and the input video signals $V_1$ and $V_2$ to be inserted are fed to the video memories 10 and 11, in which their speeds are converted to coincide with the display speed. The write and read address generators for the video memories 10 and 11 are omitted from FIG. 3.

FIG. 4 shows a second embodiment according to the present invention, which is different from the first embodiment of FIG. 2 in that it is additionally equipped with an AND gate 18 connected to the input terminal of the key memory 5 and a control switch 19. In its closed position, the control switch 19 selects whether the gate 18 is to be inhibited by the output of the key memory 6 or whether the gate 18 is to be opened at all times. In FIG. 4, like the first embodiment, the key memory 5 always writes the input key signal and outputs the key signal $S_{k1}$. The key memory 6 writes the input key signal under the control of the write controller 4. On the other hand, the erasure of the key memory 6 is accomplished by the switch 7 under the control of the erasure controller 8. When the switch 19 selects the output of the key memory 6 as shown in FIG. 4, the key signal to be inputted to the key memory 5 is inhibited by the output of the key memory 6. In other words, the key signal $S_{k2}$ delivered from the key memory 6 has priority over the key signal newly inputted to the key memory 5.

Figure 5B:
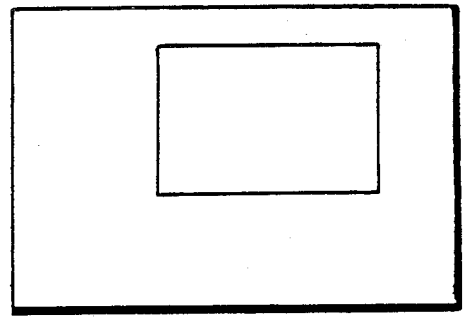
Figure 5C:
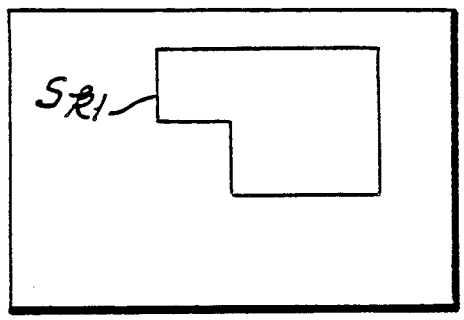
Figure 5D:
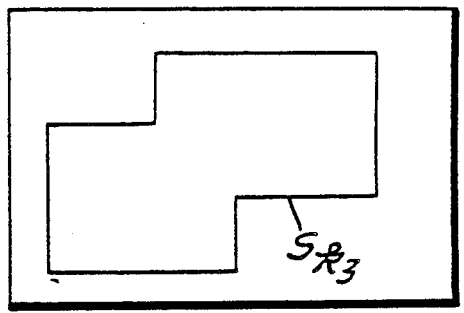

The operation of the embodiment of FIG. 4 will be explained with reference to FIGS. 5(a) to (d). A key signal shown in FIG. 5(a) which is delivered from the key signal generator 1 is first stored in the key memory 6 and, then, another key signal shown in FIG. 5(b) is fed from the key signal generator 1 to the gate 18. Since, at this time, the key signal outputted from the key memory 6 is applied as an inhibit signal to that gate 18, a gated key signal shown in FIG. 5(c) is stored in the key memory 5 so that the output key signal as shown in FIG. 5(c) is obtained from the key memory 5. On the other hand, another output key signal $S_{k3}$ shown in FIG. 5(d) is obtained from the OR gate 9. The embodiment of FIG. 4 can attain the specific effect because a picture to be displayed can be composed by assigning priorities to the two key signals.

FIG. 6 shows a third embodiment of the present invention, which is equipped with key memories 20 to 24 to receive respective key signals, a selector 25 to select one from the four input key signals $IS_{k1}$ to $IS_{k4}$, write address generators 26 to 29 to generate respective write addresses $WA_1$ to $WA_4$ of the key memories 20 to 23, an address selector 30 to select one write address from the write addresses $WA_1$ to $WA_4$ to supply it to the key memory 24, and a read address generator 31 to generate a read address RA to commonly supply it to the key memories 20 to 24. This embodiment can process the input key signals $IS_{k1}$ to $ISk4$ even if they are asynchronous with each other, because the write address generators 26 to 29 are independent of one another. Further, there are additionally disposed AND gates 32 to 36, inverters 37 to 40, OR gates 41 and 42, and NAND gates 43 and 44, as shown in FIG. 6.

The key memories 20 to 23 always write the input key signals $IS_{k1}$ to $IS_{k4}$, respectively, at their display speed and deliver output key signals $OS_{k1}$ to $OSK_4$ at a speed of a display device. The key input signals $IS_{k1}$ to $ISK_4$ are further inputted to the selector 25, in which one of them is selected by a selection signal SE and inputted to the key memory 24. The one input key signal thus selected is written in the key memory 24 only when a control signal WE allows. The stored content of the key memory 24 is read out at the display speed and delivered as a key signal $OS_{k5}$. On the other hand, the content of the key memory 24 is erased by an erasure signal ER.

A key priority selection signal PR is fed to the inverter 40 and the NAND gate 43 to determine the whether the key signal $OS_{k5}$ over the key signals $OS_{k1}$ to $OSk_4$. Specifically, when picture elements A and B, associated respectively with the key signals $OS_{k1}$ to $OSK_4$ and the key signal $OS_{k5}$ (element B) are to be composed, the key priority selection signal PR designates which of picture elements A and B has priority in case they are composed in the an overlapped manner. The key priority selection signal PR in the present embodiment takes the logical value "1", in case the key signals $OS_{k1}$ to $OSK_4$ have priority, and the logic "0" in case the remaining key signal $OS_{k5}$ has priority.

In case the priority selection signal PR takes the logical value "0", the inverter 40 produces the other logic "1", which is subjected to a NAND operation with the key signal $OS_{k5}$ in the NAND gate 44 to deliver a gate control signal GC. Accordingly, the gate control signal GC has the logical value "0" when the key signal $OS_{k5}$ is present, and the gate control signal GC is inputted to the AND gates 32 to 35 to inhibit the key signals $OS_{k1}$ to $OSK_4$, respectively.

The priority selection signal PR is also inputted to the NAND gate 43, when the signal PR has the logical value "0", the output of the NAND gate 43 becomes the logical value "1" so that the key signal $OS_{k5}$ is outputted intact through the AND gate 36.

On the contrary, when the priority selection signal PR has the logical value "1", it is inverted by the inverter 40 to apply the logical value "0" to the NAND gate 44. As a result, the gate control signal GC has the logical value "1" and exerts no inhibiting action upon the AND gates 32 to 35. Moreover, in this case, the NAND gate 43 inverts the output of the OR gate 41. Therefore, the OR operation is performed on the key signals $OS_{k1}$ to $OSK_4$ by the OR gate 41, and the resultant signal is inverted so as to be the control signal for the AND gate 36. Accordingly, in the presence of any of the key signals $OS_{k1}$ to $OSK_4$, the output of the NAND gate 43 becomes the logical value "0" such that the key signal $OS_{k5}$ is inhibited by the AND gate 36.

The AND gate 33 also receives the inverse of the key signal $OS_{k1}$ through the inverter 37 in addition to the gate control signal GC and the key signal $OS_{k2}$ from the memory 20 and gates the key signal $OS_{k2}$ to deliver an output key signal $OS_{k2}'$. The AND gate 34 likewise receives the inverse signal of the key signal $OS_{k1}$ from the inverter 37 the inverse signal of the key signal $OS_{k2}$ through the inverter 38 and gates the key signal $OS_{k3}$ to deliver an output key signal $OS_{k3}'$. Likewise, the AND gate 35 receives the outputs of the inverters 37 and 38 and an inverted signal of the key signal $OS_{k3}$ through the inverter 39 and gates the key signal $OSK_4$ to deliver an output key signal $OSK_4'$. Therefore, these AND gates 33 to 35 assign priority among the key signals $OS_{k1}$ to $OSK_4$. In other words, the key signal having the lower priority is masked in accordance with the key signal having the higher priority, when a plurality of picture elements associated with the respective key signals are composed in an overlapped manner. In the present embodiment, the priority is in the order of the key signals $OS_{k1}$, $OS_{k2}$, $OS_{k3}$ and $OS_{k4}$. The respective key signals are masked (inhibited) by the key signals having higher priority in addition to the gate control signal GC.

FIG. 7 illustrates behaviors of the respective key signals according to the third embodiment on a display screen. FIGS. 7(a), (b), (c), (d) and (e) show the key signals $OS_{k1}$, $OS_{k2}$, $OS_{k3}$, $OS_{k4}$ and $OS_{k5}$, respectively. The behaviors of the output key signals $OS_{k1}'$, $OS_{k2}'$, $OS_{k3}'$, $OSK_4'$ and $OS_{k5'}$ are shown in FIG. 7(f), (g), (h), (i) and (j) in case the key priority selection signal PR has the logical value "0", i.e., in case the key signals $OS_{k5}$ from the memory 24 has priority to the key signals $OS_{k1}$ to $OSK_4$.

The behaviors of the output key signals $OS_{k1}'$, $OS_{k2}'$, $OS_{k3}'$, $OSK_4'$ and $OS_{k5}'$ are shown in FIGS. 7(k), (l), (m), (n) and (o) in case the key priority selection signal PR has the logical value "1", i.e., in case the input key signals $OS_{k1}$ to $OSK_4$ have priority over the key signal $OS_{k5}$ Moreover, FIG. 7(p) shows the behavior of the output key signal $OS_{k6}$ which is composed of all the key signals $OS_{k1}'$ to $OS_{k5}$ by the OR circuit 42.

From these Figures, it is seen that the key signal having lower priority is masked by the key signal having higher priority. For example, FIG. 7(f) shows the behavior in which the key signal $OS_{k1}$ (FIG. 7(a)) is masked by the key signal $OS_{k5}$ (FIG. 7(e)). Further, the key signal $OS_{k2}'$ (FIG. 7(g)) is obtained in case the key signal $OS_{k2}$ (FIG. 7(b)) is masked by both the key signals $OS_{k5}$ and $OS_{k1}$ (FIGS. 7(a) and (e)). Thus, the masking operation described above means the operation to determine a picture element to be displayed in the superposed portion when two or more picture elements to be displayed are overlapped.

In order to compose a plurality of picture elements by using key signals, it is necessary that all the key signals be synchronous at a display speed. In the embodiment, this necessity is performed by writing all the input key signals into the memories at respective scanning speeds and by reading out these signals from the memories at the display speed. The key signals $IS_{k1}$ to $ISK_4$ having independent scanning speeds are produced by key signal generators 45 to 48 in the present embodiment.

As has been described hereinbefore, according to the present invention, a key signal stored at a previous instant and a key signal of the present time can be simultaneously delivered so that a novel effect in a picture composition can be produced. Moreover, according to the present invention, synchronized key signals can be obtained even when nonsynchronous input key signals having respective scanning speeds are applied.

What is claimed is:

1. A key signal producing apparatus comprising:
    key signal generating means for generating a key signal which specifies a video composition made up of a plurality of video signals;
    first memory means for receiving said key signal delivered from said key signal generating means, for storing said key signal in synchronism with a speed of said key signal, and for delivering said stored key signal from said first memory means to output it as a first output key signal; and
    second memory means for receiving said key signal delivered from said key signal generating means, for selectively stored said key signal in synchronism with a speed of said key signal, and for delivering said stored key signal from said second memory means to output it as a second output key signal.

2. A key signal producing apparatus according to claim 1, further comprising:
    write timing generating means for controlling the storing of said key signal in said second memory means; and
    erasure control means for erasing the key signal stored in said second memory means.

3. A key signal producing apparatus according to claim 1, further comprising:
    OR gate means for performing an OR operation on said first output key signal and said second output key signal and for delivering a third output key signal as the output of said OR gate means.

4. A video composing apparatus comprising a key signal producing apparatus according to claim 3; and further comprising
    first AND gate means receiving a first video signal and said first output key signal;
    second AND gate means receiving a second video signal and said second output key signal;
    third means receiving the outputs of said first and second AND gate means, receiving said third output key signal, and receiving a background video signal, and delivering an output video signal.

5. A video composing apparatus according to claim 4, wherein said third means comprises a second OR gate means receiving the output of said first and second AND gate means; and
    fourth means receiving said background video signal, said third output key signal, and the output of said second OR gate means, and delivering said output video signal wherein said first and second video signals are superimposed on said background video signal.

6. A key signal producing apparatus as claimed in claim 1, further comprising:
   gate means disposed at the input of said first memory means to control passage of said key signal to said first memory means, said gate means being controlled by the second output key signal coming from said second memory means.

7. A key signal producing apparatus according to claim 6, further comprising:
   write timing generating mean for controlling the storing of said key signal in said second memory means; and
   erasure control means for erasing the key signal stored in said second memory means.

8. A key signal producing apparatus according to claim 6, further comprising:
   OR gate means for performing an OR operation on said first output key signal and said second output key signal and for delivering a third output key signal as the output of said OR gate means.

9. A key signal producing apparatus according to claim 6, wherein said first memory means selectively receives said key signal as a first input key signal which specifies a first portion of said video composition;
   said second memory means selectively receives said key signal as a second input key signal which specifies a second portion of said video composition; and
   said first and second output key signals respectively correspond to said first and second input key signals and are applicable to a display apparatus to control the same to display said first and second portions of said video composition.

10. A key signal producing apparatus according to claim 9, further comprising read timing generating means for receiving a sync signal from said display apparatus and controlling said first and second memory means to deliver said first and second output key signals in synchronism with a speed of said display apparatus.

11. A key signal producing apparatus according to claim 1, wherein said first memory means selectively receives said key signal as a first input key signal which specifies a first portion of said video composition;
   said second memory means selectively receives said key signal as a second input key signal which specifies a second portion of said video composition; and
   said first and second output key signals respectively correspond to said first and second input key signals and are applicable to a display apparatus to control the same to display said first and second portions of said video composition.

12. A key signal producing apparatus according to claim 11, further comprising read timing generating means for receiving a sync signal from said display apparatus and controlling said first and second memory means to deliver said first and second output key signals in synchronism with a speed of said display apparatus.

* * * * *